July 24, 1923.
J. H. RAND
INDEX
Filed May 19, 1921
1,462,497
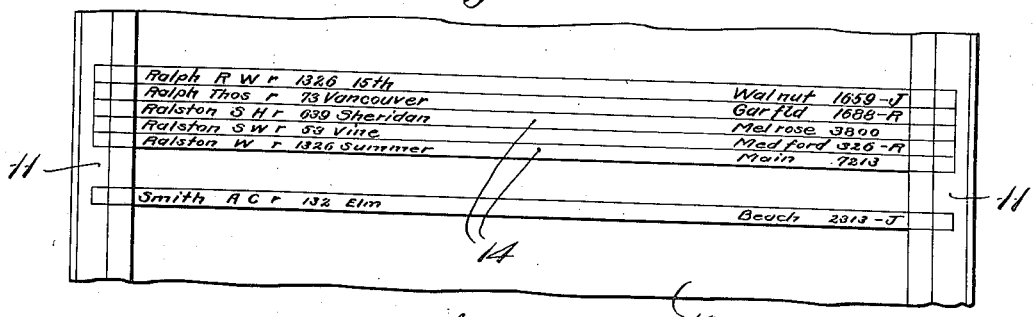
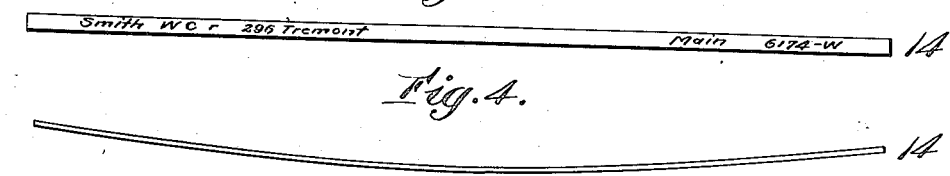
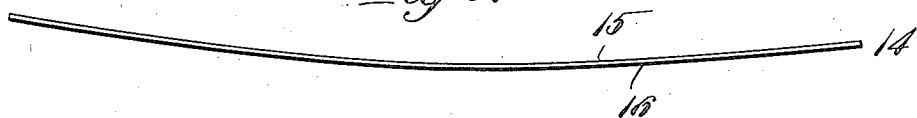
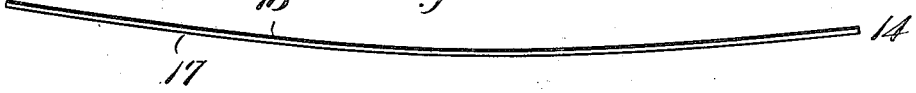
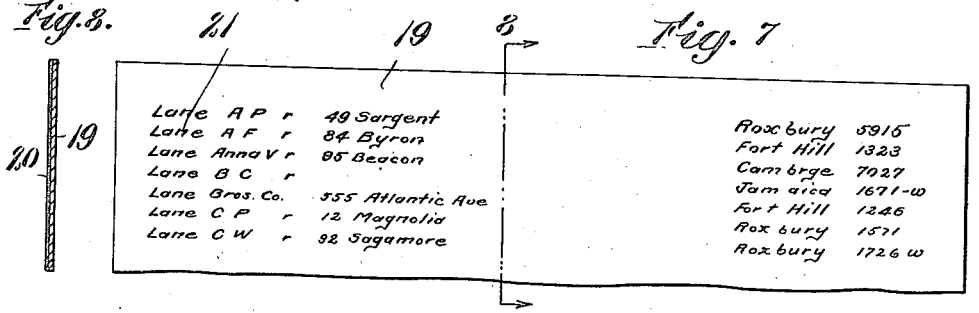
Inventor:
James H. Rand
by Robert Roberts & Cushman
attys.

Patented July 24, 1923.

1,462,497

UNITED STATES PATENT OFFICE.

JAMES H. RAND, OF NORTH TONAWANDA, NEW YORK.

INDEX.

Application filed May 19, 1921. Serial No. 470,856.

*To all whom it may concern:*

Be it known that I, JAMES H. RAND, a citizen of the United States of America, and resident of North Tonawanda, in the county of Niagara and State of New York, have invented new and useful Improvements in Indexes, of which the following is a specification.

This invention relates to indexes of the so-called visible index type wherein a series of index strips are removably and interchangeably held in a suitable frame. The invention has to do particularly with the construction of the index strips and its object is to produce an index of this type of novel and improved structure, which makes it possible to provide much narrower and less bulky index elements than has heretofore been practicable, thus greatly increasing the capacity of the index as a whole. The invention also insures a flat, even surface of the assembled series of index strips, free from irregular or individually projecting strips when the strips are mounted in the frame, side by side.

In the accompanying drawings which illustrate the invention,

Fig. 1 is a front elevation of part of an index frame showing a number of the index elements mounted therein;

Fig. 2 is an end edge view of the same;

Fig. 3 is a front elevation of one of the index elements out of the frame;

Figs. 4, 5 and 6 are side edge views showing three forms of the index element;

Fig. 7 is a plan view of part of a composite sheet from which the index elements may be made; and Fig. 8 is a section on line 8—8 of Fig. 7.

The index frame, which may be of any desired height or length, consists of a flat back 10 of stiff cardboard, sheet metal, or other suitable material, having marginal retaining flanges 11, 11, for holding the ends of the index elements. The flanges 11 are preferably made of sheet celluloid bent or folded lengthwise, the rear fold 12 being secured to the rear side of the frame back 10, and the front fold being finished with an inturned bead or lip 13 to form a finished edge and an easy entrance for the ends of the index elements. The flanges 11 are made of flexible, resilient material such as sheet celluloid, and grip or pinch the ends of the index elements with sufficient force to hold them against dislodgment while in use but still permit them to be readily adjusted, removed or inserted.

Each index element indicated generally at 14 in the several figures, consists of a relatively long and narrow strip of resilient sheet material, on which is printed, typed or written the desired inscription. The strip is normally curved or bowed in a rearward direction (see Figs. 4, 5 and 6) so that the body of the strip between its ends will be caused to lie flat against the flat surface of the frame back 10 when the ends of the strip are held down against said surface by the retaining flanges 11, 11, as shown in Fig. 2. The strips when mounted in the frame side by side will be retained flat against the back 10 and in close contact therewith under the gentle pressure exerted by the resiliency of the strip, thus presenting at all times an even, flat and substantially continuous front surface, which not only greatly enhances the good appearance of the index, but enables the user to run the finger or a pointer across the faces of the index elements in looking up a particular item without danger of catching on any projecting or irregular edges of the index elements with the consequent danger of dislodging or disarranging them. If the index strips are normally flat they have an inevitable tendency, especially in the case of very narrow strips which have little inherent stiffness, to bulge or bend forward more or less when the ends are gripped by the spring flanges 11, thus presenting an irregular front surface of the assembled index. This tendency is counteracted by giving the resilient strips a permanent rearward curve or bend which causes the strips to hug the flat back of the frame and therefore to lie in a flat, even plane.

In its simplest form, as shown in Fig. 4, each index element may be made of a single sheet of resilient material, such as a good quality of cardboard, adapted to take and retain a curved or bowed form.

Fig. 5 illustrates the form most preferred because possessing the largest number of advantages. In this form there is provided a composite index element comprising a two-ply strip, the front ply 15 consisting of transparent, resilient, sheet material, such as sheet celluloid, and the rear ply 16 consisting of sheet material which may or may not possess inherent resiliency, such as paper. The two plies are secured together by a suitable cement, which should preferably be clear and transparent, and the inscription is placed on the front surface of the rear ply which lies next to the front ply. The composite structure is normally bent or bowed rearwardly as shown. The front ply of sheet celluloid or the like both supplies the necessary resiliency for the composite strip, and also protects the inscribed surface of the rear ply from soiling, disfigurement and injury in use.

In Fig. 6 there is illustrated a further modification of the composite strip in which the rear ply 17 is made of sheet celluloid or some equivalent resilient material, and the front ply 18 is of paper or the like, cemented to the rear ply, and carries the inscription on its outer or front surface. In this form the rear ply of sheet celluloid or the like furnishes the necessary resiliency and durabilty for the structure as before, and supports the paper ply, but does not protect the inscribed surface.

The front elevation of all three forms would appear as in Figs. 1 and 3.

The novel method of making the preferred form of composite index elements (Fig. 5) may be explained in connection with Figs. 7 and 8. A sheet of transparent celluloid, or other transparent, resilient, sheet material, 19, is secured by a suitable cement to the inscribed surface of a thin sheet of paper 20, on which the index matter, such as a list of names 21, has been previously printed or inscribed in a plurality of parallel lines. The composite sheet thus formed is then bent or bowed rearwardly and transversely, that is, lengthwise of the lines of inscriptions, by means of pressure, or combined pressure and heat, applied by a suitable rod to the face of the sheet. This imparts to the sheet the desired curvature and gives it a permanent set. The sheet is then divided into the relatively long and narrow index strips by severing it along lines between the lines of the inscriptions.

A similar method may be followed in making the forms of strips illustrated in Figs. 4 and 6, except that for making the form shown in Fig. 6 the back of the paper sheet instead of the inscribed surface is cemented to the sheet celluloid, and the paper sheet is on the concave side instead of the curvex side of the bent or curved structure, and for making the form shown in Fig. 4 the step of building the two-ply structure is omitted as the strip is made from a single sheet of resilient material. The index characters, as before, appear on the concave side of the bowed strip.

The invention makes it possible to use exceedingly narrow index strips and thus to display a very much larger list of items within a given space than has heretofore been practicable. It has particular utility for very voluminous indexed matter in which frequent changes are necessary, such as telephone lists used by "information" operators and credit lists used by mercantile establishments, which often contain many thousands of names and sometimes hundreds of thousands of names. The individual index strips which would be difficult and costly to make singly may be easily and economically made by the method above described of printing the list on an ordinary sheet of paper and then cementing the sheet to a sheet of celluloid, imparting to the composite structure the desired curvature, and severing it into strips between the lines of printing. Thus the strips may be made from any previously prepared list such as the leaves cut from an ordinary telephone directory.

I claim:

1. A composite index element for indexes of the character described comprising a relatively long and narrow multi-ply strip, one ply being of resilient, sheet material and another ply being of sheet material carrying an inscription, the plies being cemented together, and said composite strip being stiffly resilient whereby the strip may be temporarily bent without permanent distortion to insert it in a frame, and whereby the body of the strip between its ends will lie flat against a flat surface and be so self-retained when held at its ends.

2. A composite index element for indexes of the character described comprising a relatively long and narrow multi-ply strip, one ply being of resilient, sheet material and another ply being of sheet material carrying an inscription, the plies being cemented together and said composite strip being normally bowed in a rearward direction, whereby the body of the strip between its ends will lie flat against a flat surface and be so retained under gentle pressure due to the resiliency of the strip when the ends are held down against such surface.

3. A composite index element for indexes of the character described comprising a relatively long and narrow multi-ply strip, the front ply being of transparent, resilient, sheet material, and the adjacent ply being of sheet material carrying an inscription on the side which lies next to the transparent front ply, by which ply the inscribed surface of the other ply is protected, the plies being cemented together and said composite strip being normally bowed in a rearward direction, whereby the body of the strip between its ends will lie flat against a flat surface and be so retained under gentle pressure due to the resiliency of the strip when the ends are held down against such surface.

4. A composite index element for indexes of the character described comprising a relatively long and narrow two-ply strip, one ply consisting of sheet celluloid, and the other ply consisting of paper carrying an inscription, the two plies being cemented together and said composite strip being normally bowed in a rearward direction, whereby the body of the strip between its ends will lie flat against a flat surface and be so retained under gentle pressure due to the resiliency of the strip when the ends are held down against such surface.

5. A composite index element for indexes of the character described comprising a relatively long and narrow two-ply strip, the front ply consisting of transparent, resilient, sheet celluloid, and the rear ply consisting of paper carrying an inscription on the side which lies next to the sheet celluloid by which the inscribed surface of the paper ply is protected, the two plies being cemented together, and said composite strip being normally bowed in a rearward direction, whereby the body of the strip between its ends will lie flat against a flat surface and be so retained under gentle pressure due to the resiliency of the strip when the ends are held down against such surface.

6. An index comprising in combination a frame having a flat back and marginal retaining flanges, and a series of composite index elements each comprising a relatively long and narrow multi-ply strip, one ply being of resilient, sheet material and another ply being of sheet material carrying an inscription, the plies being cemented together, said strips being removably held at their ends by said retaining flanges, each composite strip being stiffly resilient whereby it may be temporarily bent without permanent distortion to spring its ends under said retaining flanges and whereby the body of each strip between its ends will lie flat in substantially the same plane with all the other strips and be so self-retained.

7. The art of making composite index elements which comprises cementing together a sheet of resilient sheet material and a sheet containing a plurality of lines of inscriptions, and dividing the composite sheet so formed into a plurality of relatively long and narrow strips by severing it along lines between the lines of the inscriptions.

8. The art of making composite index elements which comprises cementing together a sheet of resilient sheet material and a sheet containing a plurality of lines of inscriptions, imparting to the composite structure a permanent rearward bend lengthwise of the index elements, and dividing the composite sheet so formed into a plurality of relatively long and narrow strips by severing it along lines between the lines of the inscriptions.

Signed by me at Boston, Massachusetts, this seventeenth day of May, 1921.

JAMES H. RAND.